United States Patent Office 3,297,819
Patented Jan. 10, 1967

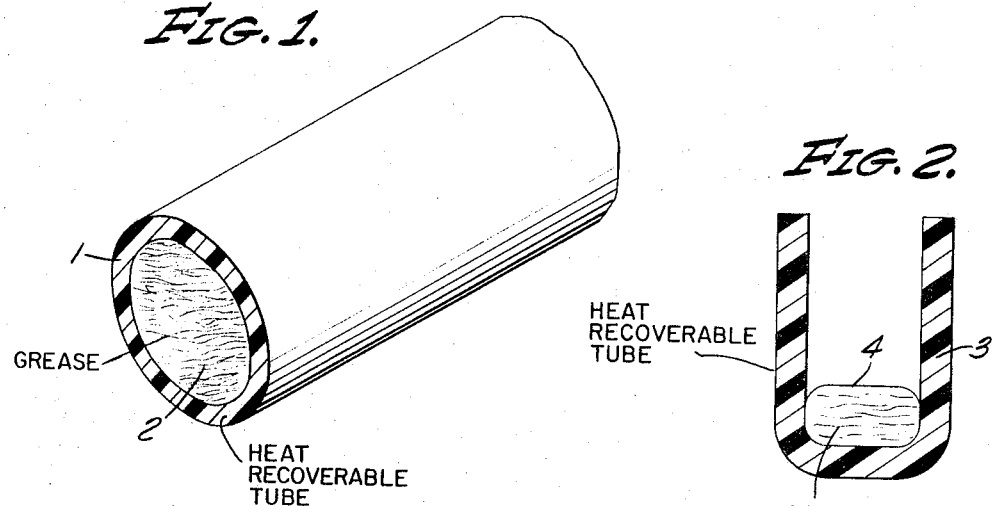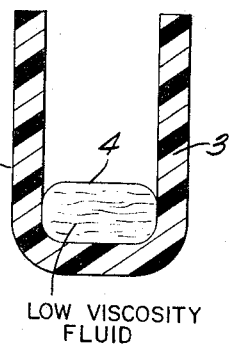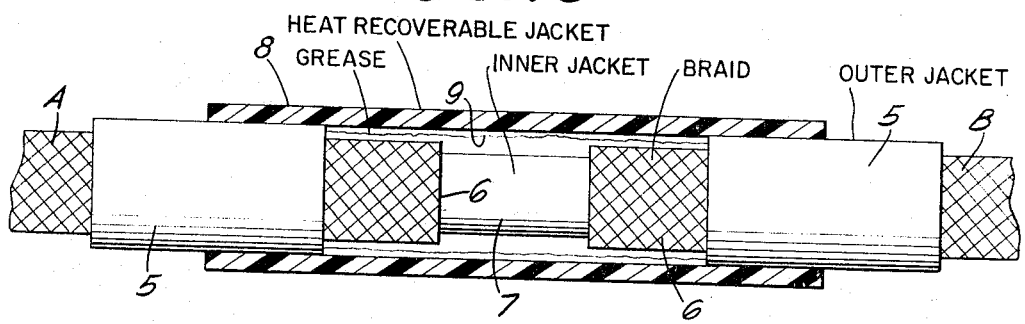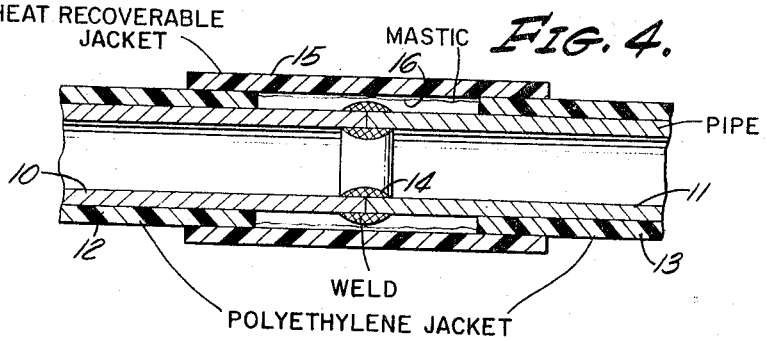

3,297,819
HEAT UNSTABLE COVERING
Judson Douglas Wetmore, San Diego, Calif., assignor to Raychem Corporation, Redwood City, Calif., a corporation of California
Filed Aug. 10, 1964, Ser. No. 388,643
22 Claims. (Cl. 174—127)

The present application is a continuation in part of my copending application Serial No. 211,747, filed July 23, 1962, and now Patent No. 3,243,211, the disclosure of which is incorporated herein by reference.

The present invention relates to articles which are capable of changing shape and which contain materials which are fluid at ordinary temperatures. When the article of the present invention undergoes a change in shape, it functions to cause the fluid combined therewith to flow, to come in contact with another member, or to perform some other useful function. Virtually any type of fluid may be used in the present invention, but it has been found that high viscosity materials such as greases, including silicone greases, and mastic are particularly suitable. The fluid materials contemplated for use in the present invention may be defined as substantially noncrystalline materials which have a viscosity of not more than about $10^{13}$ centipoise at 25° C. It should be understood that the fluid materials of the present invention include thixotropic materials.

In general, any of the materials and articles capable of changing shape disclosed in my said copending application are suitable for use in the present invention. Preferably, the articles of the present invention will be heat recoverable articles such as articles which have elastic memory or plastic memory.

It has been long recognized that recoverable articles are useful for covering other articles. Various types of heat recoverable articles such as those disclosed in United States Patents 2,027,962 and 3,086,242 are also known to those skilled in the art. Furthermore, it has previously been proposed that articles which are capable of changing shape be provided with a layer of fusible material so as to render these articles capable of forming a highly efficient bond with the articles to which they are attached. This efficient bond results from causing the fusible material to flow in conjunction with causing the recoverable member to change shape, thereby causing the now-flowable fusible material to come into contact with the article to which the recoverable member is to be bonded. Such articles are disclosed in my copending application, Serial No. 211,747.

While these prior art articles have been satisfactory for many uses, it has been found that they do not function in the most effective manner in several environments. For example, it has been found that difficulties involving corrosion, corona discharge, moisture penetration, etc., are associated with the prior art articles.

Thus, it is a primary object of the present invention to provide articles capable of changing shape which are not subject to the above-noted and other disadvantages of prior art articles.

It is another object of the present invention to provide articles comprising a member capable of changing shape in combination with a material which is fluid at ordinary temperatures.

Other objects and advantages of the present invention it is believed will be apparent from the following detailed description of specific embodiments thereof when read in connection with the drawings.

Briefly, the present invention comprises, in part, a recoverable article in combination with a material having a viscosity of not more than about $10^{13}$ centipoise at 25° C. The recoverable articles of the present invention preferably comprise heat recoverable articles, such as articles made from materials having the property of elastic memory. The recoverable articles of the present invention may also comprise elastic materials which have been stretched and are temporarily held in the stretched condition subject to the application of heat, articles made from materials having the property of plastic memory, shrinkable articles or the like. The fluid materials which are combined with the recoverable article according to the present invention may be of virtually any type and the composition thereof will primarily depend upon the use to which the article is to be put. For example, this fluid material may comprise oils, greases, adhesives, metals, etc. If desired, finely divided materials may be added to the fluid material to impart preferred properties thereto. For example, finely divided graphite may be added to an oil or grease to render the same conductive.

Often, the articles of the present invention will have a generally tubular shape. In this event, the fluid material may cover all or part of one or both of the internal and external surfaces thereof. The articles of the present invention comprising a recoverable member in combination with a fluid material are caused to assume a shape and/or dimension different from the shape and/or dimension which the article is to assume after recovery. The recoverable member may be provided with the fluid material before or after it is caused to assume its recoverable shape or dimension. The articles of the present invention may be expected to find their widest utility in processes involving lamination. For example, a tubular recoverable member having a coating of grease on the internal surface thereof may be used to inhibit corona discharge of an electrical cable, particularly a cable splice, by passing the cable through the recoverable article and causing the article to recover radially inwardly whereby the recoverable member is caused to move toward the cable and press the grease against the cable. The grease will, of course, flow under the compressive force exerted by the recoverable member and will function to fill any voids which might otherwise exist between irregularities on the surface of the cable and the recoverable member. In the case of cable splices where a substantial amount of irregularity is present on the surface of the splice, use of the article of the present invention is particularly advantageous. Furthermore, the continued compressive force exerted by the recoverable member will insure that any voids which may be subsequently caused by flexing the cable or for any other reason will be filled since the recoverable member will cause the grease to fill any such voids. Still further, when articles of the present invention wherein the recoverable member comprises an elastic memory material are used to provide a covering on a metallic object, e.g., when such a recoverable article is used to provide a protective covering on a metallic pipe, an additional compressive force will be exerted by the recoverable member and the metallic substrate because of the difference in the coefficient of thermal expansion of these materials. In other words, in addition to the compressive force resulting from the elastic memory properties of the recoverable member, the fact that the coefficient of thermal expansion of the elastic memory material will be greater than that of the metal of the pipe or other substrate to which it is applied will result in contraction of the pipe on cooling which is less than the contraction of the elastic memory material even if the pipe is heated to the same temperature as the recoverable member. Thus, a pressure will be exerted by the recoverable member on the fluid material and substrate after the recoverable member has cooled which is greater than that exerted when the recoverable member is still hot after being caused to undergo recovery. This is particularly important in many applications where self-sealing of the protective coating is important since by the proper choice of fluid material e.g., mastic, a self-sealing mechanism will be available because the pressure which the recoverable member continues to exert after it has been applied will cause the fluid material to be forced into any holes or cracks which may later be made in the recoverable member.

In the drawings:

FIGURE 1 illustrates an embodiment of an article of the present invention in which the article has a tubular shape.

FIGURE 2 illustrates another embodiment of the present invention wherein the article is cup shaped.

FIGURE 3 illustrates the manner in which an article of the present invention may be used to effect a shield splice.

FIGURE 4 illustrates the manner in which an article of the present invention may be used to effect a corrosion resistant covering for a pipe joint.

Referring now to the drawings, the article illustrated in FIGURE 1 comprises a recoverable member 1 and a fluid material 2 which is coated on the internal surface of recoverable member 1. In this embodiment it is preferred that fluid material 2 be of sufficient high viscosity such that it will not readily flow out of recoverable member 1. High viscosity hydrocarbon greases and silicone greases and high viscosity adhesives, particularly adhesives capable of being activated by heat, are examples of suitable fluids which may be used. However, other materials such as mastic, glue or any other similar material may be used. Furthermore, it is to be understood that the present invention is not limited to high viscosity materials and that low viscosity materials may also be used in those instances where the difficulty of restraining the low viscosity material from flowing out of the recoverable member is compensated by other properties of low viscosity material.

Preferably, recoverable member 1 comprises a material having the property of elastic memory such as those disclosed in United States Patent No. 3,086,242. As is well known to those skilled in the art, materials having the property of elastic memory are dimensionally heat unstable and may be caused to change shape and/or dimension simply by the application of heat. Elastic memory may be imparted to polymeric materials by first extruding or otherwise molding the polymer into a desired shape. The polymer is then cross-linked or given the properties of a cross-linked material by exposure to high energy radiation, e.g., a high energy electron beam, initiation of cross-linking by exposure to ultra-violet irradiation, or by chemical means, e.g., peroxides when polyolefins are used. The cross-linked polymeric material is then heated and deformed and then locked in that condition by quenching or other suitable cooling or, in the alternative, the same process can be accomplished at room temperature by using greater force to deform the polymer. The deformed material will retain its shape almost indefinitely until exposed to an elevated temperature sufficient to cause recovery, e.g., approximately 250° F. in the case of polyethylene. Among the polymers which may be so processed are polyolefins such as polyethylene and polypropylene, polyamides, polyurethanes, polyvinylchloride, polyvinylidenefluoride, and elastomeric materials such as those disclosed in copending application Serial No. 65,953, filed October 31, 1960. The property of elastic memory may also be imparted to materials having the properties of cross-linked polymers such as polytetrafluoroethylene and polyolefins or vinyl polymers which have a molecular weight which is sufficiently high to give the polymer appreciable strength at temperatures above the crystalline melting point.

It is to be understood that the present invention is not limited to recoverable members fabricated from elastic memory materials, but also includes other dimensionally heat unstable materials. For example, a crystallizable elastomeric material which has been distended, held in the distended state and subject to refrigeration to "freeze" it in its distended state may be used as the recoverable member of the article of the present invention. Such an article would be caused to change shape and/or dimension merely by exposure to room temperature. In addition, elastic materials which are held in a stretched condition by a heat unstable material such as the articles disclosed in my copending application Serial No. 211,747 may also be used.

The articles of the present invention are not limited to any particular configuration and may, as illustrated in FIGURE 2 be cup shaped. As illustrated in this figure, recoverable member 3 contains a fluid 4. This embodiment of the present invention is more suitable for low viscosity fluids than that illustrated in FIGURE 1 since the fluid may more easily be retained in recoverable member 3 than in recoverable member 1. Thus, fluids such as mercury, low viscosity waxes and solvents may more easily be combined with a recoverable article when the embodiment of FIGURE 2 is used.

The articles of the present invention have a wide variety of uses and are particularly suitable for forming protective coverings. For example, articles such as that illustrated in FIGURE 1 may be used as a corrosion protection on metallic pipe when the fluid material is a material such as a high viscosity asphalt, electrically insulative elastic resinous material or mastic composition, as a moisture protective coating for electrical conductors when the fluid material is an organic grease or other suitable material and as a corona discharge inhibitor when the fluid material is an organic or silicone grease or other suitable material, particularly when the grease or other material has been provided with a conductive material. Among the advantages of using the articles of the present invention are simple and fast installation since only one component need be installed, better quality control since the quantity, uniformity and quality of the fluid material may be established by the manufacturer and not by the individual worker in the field, and adaptability of a single article for covering a substantial range of sizes. The article of FIGURE 2 is particularly useful for end terminations of electrical conductors, metallic conduits and other articles.

The present invention is further illustrated by the following examples.

*Example I*

To demonstrate the utility of an article produced according to the present invention in establishing a shield splice, the article illustrated in FIGURE 3 was prepared. A portion of the outer jacket 5 of a shielded electrical conductor was removed to expose braided shielding 6. A portion of shielding 6 was then removed to expose a portion of inner jacket 7. A polyethylene tube 8 having the property of elastic memory and lined with a silicone grease 9 which grease contained 40 percent by weight finely divided graphite was then placed over the exposed braid as illustrated in FIGURE 3. Sufficient heat to cause the tube 8 to contract around exposed braid 6 and inner jacket 7 was then applied thereby causing grease 9 to fill any remaining space between tube 8 and braid 6 or jacket 7.

An electrical resistance measurement made between points A and B was then made. This resistance measurement was found to be 30 ohms thereby establishing that conductive grease 9 functioned effectively to form a shield splice.

*Example II*

It is well known that metallic pipes which are buried in the ground are subjected to severe attack by corrosion and many proposals for protecting such pipes have been made. One of the most effective methods has been to extrude a covering of a plastic material on the external surface of the pipe, e.g., in the manner described in Patent No. 3,012,585. However, there has not previously been available any satisfactory means for protecting the joints formed when the ends of such coated pipes are joined. The present invention provides such means.

As illustrated in FIGURE 4, sections of metallic pipe 10 and 11 which are provided with conventional extruded polyethylene jackets 12 and 13 were first joined by a suitable weld 14. They are cut back to expose bare pipe in the weld area to prevent the welding operation from damaging the jackets. A polyethylene tube 15 having the property of elastic memory was provided with a coating of mastic available as Johns-Manville Asbestos Fibrous Roof and Foundation Coating. The outside diameter of the jacketed pipe was 1.12 inches, the inside diameter of tube 15 was 1.8 inches and the thickness of the coating thereon was about 0.05 inch. A test with another polyethylene tube similar to tube 15 established that it would contract radially to a recovered inside diameter of 0.9 inch upon application of sufficient heat.

Tube 15 having coating 16 thereon was then passed over the exposed section of pipe in the manner illustrated in FIGURE 4 and a temperature of 275° F. was applied. Tube 15 then recovered tightly around pipe sections 10 and 11 and jackets 12 and 13. Some coating 16 was forced out of the ends of tubing 15 and was simply wiped away. When the assembled article had cooled to room temperature, a hole was punched in tube 15 at a point where this tube was covering pipe 10. Mastic coating 16 quickly flowed into and closed this hole because of the thixotropic properties of the mastic acting in cooperation with the pressure excited by tube 15. Thus, the article of the present invention not only provides a protective covering of high quality, it also has self-sealing characteristics. As described above, the difference in coefficient of thermal expansion between tube 15 and pipe 10 is an important factor in providing this self-sealing capability.

*Example III*

In an electrical cable carrying high voltage, corona discharge may occur in air voids due to ionization of the air. When the cable has an irregular surface such as those often possessed by cable splices or braided cable, it has been found exceedingly difficult to prevent the presence of such air voids and corona discharge has been the result.

An article of the type illustrated in FIGURE 1 was prepared by providing a polyethylene tube having the property of elastic memory with a 25 mil inside coating of a hydrocarbon grease containing finely divided lead, copper and graphite flakes available commercially as Jet-Lube Kopr-Kote and described in United States Patent No. 2,543,741. This coated tubing was applied to a fairly smooth metal rod by the application of sufficient heat to cause it to contract tightly around the rod and the corona inception point was measured on a Deschel Electronics corona test set model CT-D and found to be 1000 volts. The corona extinction point of this article was found to be 800 volts.

A control sample comprising the same metal rod covered by the same manner with the same tubing without any grease coating was found to have a corona inception point of 350 volts and a corona extinction point of 300 volts.

A polyethylene cap having the property of elastic memory such as that illustrated in FIGURE 2 was half filled with a fluorocarbon grease containing finely divided copper flakes available commercially as Jet-Lube SS-30. A stub splice comprising free wires was prepared and inserted into the cap. The cap was recovered around the splice in the manner previously described and the corona inception point was again measured. It was found to be 1200 volts as compared with a value of 820 volts for the same cap without any grease. The corona extinction point of the grease-lined cap was found to be 1050 volts while that of the unlined cap was 700 volts.

*Example IV*

It has long been recognized that moisture protection is an extremely desirable property for electrical insulating materials. To demonstrate the high degree of water resistance which may be obtained by use of the articles of the present invention, a polyethylene cap having the property of elastic memory such as that illustrated in FIGURE 2 was half filled with a silicone grease (Dow Corning DC-4) and applied to a stub splice comprising three wires in the manner previously described. The covered splice was then immersed in a 5% sodium chloride solution for 48 hours.

Insulation resistance was measured before and after immersion at 500 volts. It was found that before immersion the resistance was $15 \times 10^6$ megohms and after 48 hours after immersion the resistance was $13 \times 10^6$ megohms. Thus, the article of the present invention gave a very high degree of water immersion protection.

*Example V*

A length of polyethylene tubing which had been irradiated to a dose of 15 megarads and which had been given the property of elastic memory such that it would increase in diameter upon the application of sufficient heat was provided with an outer coating of mastic (Johns-Manville Asbestos Fibrous Roof and Foundation Coating). The polyethylene tubing had an outside diameter of 2.015 inches and the mastic layer was 20–30 mils thick. The coated polyethylene tubing was then inserted into a length of aluminum pipe having an inside diameter of 2.082 inches. This assembly was then heated such that the tubing was exposed to a temperature of 575° F. until the tubing expanded and forced the mastic into contact with the inner surface of the aluminum pipe. Upon cooling and examining the aluminum pipe, it was observed that a highly effective protective coating had been imparted to the pipe.

*Example VI*

A length of polyethylene tubing which had been irradiated to a dose of 15 megarads and which had been provided with the property of elastic memory such that it would increase in diameter upon the application of sufficient heat was provided with an outer coating of Montor wax (manufactured by Monsanto Chemical Company). The polyethylene tubing had an outside diameter of 0.51 inch and the layer of wax was 20–30 mils thick. The coated tubing was inserted into an aluminum pipe having an inside diameter of 0.55 inch and heated in an oven at 200° C. for ten minutes. The tubing expanded and forced the wax into contact with the inner surface of the aluminum pipe. Upon cooling and examination it was observed that a highly effective coating had been imparted to the pipe.

Articles coming within the scope of the present invention are suitable for use in a wide variety of embodiments other than those specifically described herein. For example, the change in shape of the recoverable member may be employed to cause a conductive fluid to flow so as to make or break an electrical contact. These articles may also be used as metering devices. For example, an article such as that illustrated in FIGURE 2 could be used to cause a predetermined amount of a liquid such as mercury to flow upon the application of a sufficient amount of heat to cause recoverable member 3 to change shape to the desired extent. Such devices could be calibrated to deliver a given amount of liquid upon the application of a given amount of heat. The liquid so delivered by a metering device could be used to initiate a chemical reaction, supply a desired additive to another composition, etc.

In addition, the articles of the present invention may have any desired configuration. This configuration will in most cases be determined by the shape of the articles with which the articles of the present invention are to be laminated or otherwise united or by the function which the article is intended to serve. Furthermore, as illustrated by Examples V and VI, it is to be understood that the present invention is equally applicable to recoverable members which expand rather than contract. Thus, by providing a tubular recoverable member with a fluid material which surrounds the external surface thereof, an article which is particularly suitable for lining the internal surfaces of tubular members such as pipes is produced. According to this embodiment, the article of the present invention is positioned within the pipe which it is desired to line, and heat is applied to the article. The article of the present invention is thus caused to expand in diameter and the fluid material is brought into contact with the internal surface of the pipe. As previously indicated the choice of a suitable material such as mastic will result in a highly effective protective coating being imparted to the pipe.

The articles of the present invention may be provided with a configuration such that recovery of the article will cause a desired flow pattern of the fluid material. For example, a rib or ridge may be provided upon the recoverable member which will restrict the flow of the fluid material to a certain desired area.

The recoverable article may also be combined with a substantially rigid fusible member in a manner described in my copending application Serial No. 211,747, and in such cases the recoverable member may simply be an elastic material such as rubber or a metal spring as disclosed in my copending application.

It will be readily apparent to those skilled in the art that a wide range of fluid materials which are non-crystalline and which have a viscosity of not more than about $10^{13}$ centipoise at 25° C. may be used in the present invention. These materials may be organic or inorganic and may also be thixotropic, i.e., have the property of becoming less viscous when subjected to shear. In addition, these materials may be thermosetting or otherwise hardenable. Thus, the heat applied to cause the recoverable member to undergo a change in dimension may also cause the fluid material to harden. In other cases, the fluid material may harden merely by exposure to the atmosphere at room temperature as in the case of certain silicone greases. The fluid materials used in the present invention are also characterized by the fact that they have substantially no rigidity and do not require the heat necessary to cause the recoverable member to change dimension to cause them to become flowable. On the other hand, many of the fluid materials of the present invention will undergo a decrease in viscosity with an increase in temperature. Thus, the fluid material used in the present invention may easily be distinguished from the fusible members disclosed in my copending application Serial Number 211,747 since these fusible members become fluid only when the temperature of the article is raised.

Having fully described the present invention, it is to be understood that it is not to be limited to the specific details set forth, but is of the full scope of the appended claims.

I claim:

1. An article, closed in cross section, comprising a material which has been dimensionally changed from an original heat stable form to an independently dimensionally heat unstable material capable of moving in the direction of its original form upon the application of heat alone, and a substantially noncrystalline material having a viscosity of not more than about $10^{13}$ centipose at 25° C. and positioned on the surface of said material within the direction of dimensional change of said dimensionally heat unstable material.

2. The article of claim 1 wherein said dimensionally heat unstable material has the property of elastic memory.

3. The article of claim 1 wherein said noncrystalline material is an organic material.

4. The article of claim 1 wherein said dimensionally heat unstable material is a crosslinked polymer.

5. The article of claim 1 wherein said noncrystalline material comprises a hydrocarbon grease.

6. The article of claim 5 wherein said hydrocarbon grease has finely divided particles of a conductive material dispersed therein, said finely divided particles being present in an amount sufficient to render said grease electrically conductive.

7. The article of claim 1 wherein said noncrystalline material is a silicon grease.

8. The article of claim 7 wherein said silicon grease has finely divided particles of a conductive material dispersed therein, said particles being present in an amount sufficient to render said grease electrically conductive.

9. The article of claim 1 wherein said noncrystalline material is a mastic material disposed on at least one surface of said heat unstable material and said mastic material being flowable at ordinary temperatures.

10. A tubular article, the wall thereof comprising a material which has been dimensionally changed from an original heat unstable form to an independently dimensionally heat unstable material capable of moving in the direction of its original form upon the application of heat alone and a substantially noncrystalline material having a viscosity of not more than $10^{13}$ centipoise room temperature positioned on the surface of said wall within the direction of dimensional change of said dimensionally heat unstable wall.

11. The article of claim 10 wherein said noncrystalline material comprises a hydrocarbon grease.

12. The article of claim 11 wherein said hydrocarbon grease has finely divided particles of a conductive material dispersed therein, said finely divided particles being present in an amount sufficient to render said grease electrically conductive.

13 The article of claim 10 wherein said noncrystalline material is a silicon grease.

14. The article of claim 13 wherein said silicon grease has finely divided particles of a conductive material dispersed therein, said particles being present in an amount sufficient to render said grease electrically conductive.

15. The article of claim 10 wherein said noncrystalline material is a mastic material disposed on at least one surface of said heat unstable material and said mastic material being flowable at ordinary temperatures.

16. The article of claim 10 wherein said recoverable material comprises a crosslinked polymer having the property of elastic memory.

17. The article of claim 16 wherein said polymer is crosslinked polyolefin.

18. The article of claim 17 wherein said polyolefin is polyethylene.

19. The article of claim 10 wherein said tubular article has said noncrystalline material coated on the external surface thereof.

20. The article of claim 10 wherein said noncrystalline material is coated on both the internal and external surfaces of said tubular article.

21. A tubular article, the wall thereof comprising a material which has been dimensionally changed from an original heat stable form to an independently dimensionally heat unstable material capable of moving in the direction of its original form upon the application of heat alone and a substantially noncrystalline material having a viscosity of not more than about $10^{13}$ centipoise at 25° C. and positioned within the direction of dimensional change of said dimensionally heat unstable wall, the ends of said tube comprising means for dimensional change in a direction substantially preventing the passage of said noncrystalline material beyond said ends when an external member is telescoped therewith and upon the application of heat sufficient to cause said dimensionally heat unstable material to change dimension.

22. An electrical conductor, an insulating material covering at least a portion of said conductor, said insulating material comprising a material capable of having the property of dimensional heat instability imparted thereto and corona discharge-inhibiting material positioned between said conductor and said insulating material, said insulating material exerting pressure on said corona discharge-inhibiting material sufficient to cause said corona discharge-inhibiting material to substantially fill the space between said insulating material and said conductor, said corona discharge-inhibiting material comprising a grease having finely divided conductive material dispersed therein, said finely divided conductive material being present in sufficient amount to render said corona discharge-inhibiting material conductive.

References Cited by the Examiner

UNITED STATES PATENTS

| | | |
|---|---|---|
| 2,027,961 | 1/1936 | Currie. |
| 2,027,962 | 1/1936 | Currie. |
| 2,444,034 | 5/1945 | Collings et al. 156—49 X |
| 2,790,285 | 7/1953 | Pike et al. 343—107 |
| 3,035,113 | 5/1962 | Danchuk 174—75 X |
| 3,148,011 | 9/1964 | Brown 174—75 X |
| 3,152,028 | 10/1964 | McLaughlin et al. 174—127 X |
| 3,244,800 | 5/1966 | McLaughlin et al. 174—127 X |

LEWIS H. MYERS, *Primary Examiner.*

H. HUBERFELD, *Assistant Examiner.*

UNITED STATES PATENT OFFICE
CERTIFICATE OF CORRECTION

Patent No. 3,297,819            January 10, 1967

Judson Douglas Wetmore

It is certified that error appears in the above identified patent and that said Letters Patent are hereby corrected as shown below:

Column 8, line 22, "unstable" should read -- stable --; line 26, after "centipoise" insert -- at --.

Signed and sealed this 24th day of February 1970.

(SEAL)
Attest:

Edward M. Fletcher, Jr.            WILLIAM E. SCHUYLER, JR.

Attesting Officer            Commissioner of Patents